(12) United States Patent
Viswanathan et al.

(10) Patent No.: US 10,621,838 B2
(45) Date of Patent: Apr. 14, 2020

(54) EXTERNAL VIDEO CLIP DISTRIBUTION WITH METADATA FROM A SMART-HOME ENVIRONMENT

(71) Applicant: Google LLC, Mountain View, CA (US)

(72) Inventors: Nitin Viswanathan, San Francisco, CA (US); James Edward Stewart, San Mateo, CA (US)

(73) Assignee: Google LLC, Mountain View, CA (US)

( * ) Notice: Subject to any disclaimer, the term of this patent is extended or adjusted under 35 U.S.C. 154(b) by 30 days.

(21) Appl. No.: 15/843,108

(22) Filed: Dec. 15, 2017

(65) Prior Publication Data

US 2019/0188980 A1 Jun. 20, 2019

(51) Int. Cl.
*G08B 13/196* (2006.01)
*H04N 7/18* (2006.01)
*G06K 9/00* (2006.01)

(52) U.S. Cl.
CPC ... *G08B 13/19656* (2013.01); *G06K 9/00288* (2013.01); *G06K 9/00711* (2013.01); *G06K 9/00771* (2013.01); *G08B 13/19602* (2013.01); *G08B 13/19673* (2013.01); *G08B 13/19684* (2013.01); *H04N 7/181* (2013.01); *G06K 2009/00738* (2013.01)

(58) Field of Classification Search
CPC ........ G08B 13/19656; G08B 13/19684; G08B 13/19673; G08B 13/19602; G06K 9/00711; G06K 9/00288; G06K 2009/00738; H04N 7/181
See application file for complete search history.

(56) References Cited

U.S. PATENT DOCUMENTS

| | | | |
|---|---|---|---|
| 2013/0166711 A1* | 6/2013 | Wang | H04N 7/181 709/223 |
| 2014/0132763 A1* | 5/2014 | Billau | H04N 7/162 348/143 |
| 2016/0110972 A1* | 4/2016 | Renkis | H04L 67/1097 709/205 |
| 2016/0364927 A1* | 12/2016 | Barry | H04L 63/08 |
| 2017/0034483 A1* | 2/2017 | Aghdasi | H04N 7/181 |
| 2017/0061214 A1* | 3/2017 | Huang | G06K 9/00711 |
| 2017/0070775 A1* | 3/2017 | Taxier | H04L 12/2825 |
| 2017/0193810 A1* | 7/2017 | Cao | G08B 29/185 |
| 2017/0289601 A1* | 10/2017 | Ganster | H04N 21/2743 |
| 2018/0211503 A1* | 7/2018 | Baliga | H04L 12/2816 |

* cited by examiner

*Primary Examiner* — Francis Geroleo
(74) *Attorney, Agent, or Firm* — Kilpatrick Townsend & Stockton LLP

(57) ABSTRACT

Various arrangements for video clip distribution for a smart home environment are presented. A video stream of the smart home environment may be received. A cloud-based storage system may be used to store the video stream. One or more event analysis processes can be performed on the stored video stream to identify an occurrence of a type of event. Event metadata may be stored by the cloud-based storage system that identifies the types of events that have occurred. An external analysis system may send a clip request. In response, the cloud-based storage system may retrieve a video clip from the video stream corresponding to a time period indicated in the clip request. The cloud-based storage system may also identify event metadata corresponds to the clip request. The cloud-based storage system may transmit to the external analysis system via the Internet, the video clip and the event metadata.

12 Claims, 6 Drawing Sheets

EXTERNAL VIDEO CLIP DISTRIBUTION WITH METADATA FROM A SMART-HOME ENVIRONMENT

BACKGROUND

Smart devices, such as streaming video cameras, are becoming more prevalent in homes. A streaming video camera may have its services, such as video storage and access, hosted by a cloud-based provider other than a provider that provides the home with security services. For instance, a home may have a legacy security system installed that provides a notification to a security company when an alarm condition is present. While the streaming video camera and alarm system may have their respective services maintained by different providers, in determining whether an emergency situation, such as a burglary or fire, is occurring, it would be useful to integrate services of the streaming video camera with services of the security system.

SUMMARY

Various methods, systems, non-transitory computer readable mediums, and apparatuses for video clip distribution for a smart home environment are presented herein. In some embodiments, a method for video clip distribution for a smart home environment is described. The method may include receiving, from a streaming video camera via the Internet by a cloud-based storage system, a video stream of the smart home environment. The method may include storing, by the cloud-based storage system, the video stream of the smart home environment. The method may include performing, by the cloud-based storage system, a plurality of event analysis processes. Each event analysis process of the plurality of event analysis processes may analyze the stored video stream for an occurrence of a type of event. The method may include storing, by the cloud-based storage system, event metadata based on the performed plurality of event analysis processes. The event metadata may include: the type of event and a timestamp. The method may include receiving, from an external analysis system via the Internet, a clip request indicative of a particular time or time period. The method may include retrieving, by the cloud-based storage system, a video clip from the video stream or from a stored video clip database in response to the clip request. The method may include identifying, by the cloud-based storage system, the event metadata that corresponds to the clip request based on the timestamp and the indicated time period. The method may include transmitting, by the cloud-based storage system to the external analysis system via the Internet, the video clip and the event metadata.

Embodiments of such a method may include one or more of the following features: The method may include transmitting, by the cloud-based storage system, an access token to the external analysis system. The access token may be mapped to a user account to which the streaming video camera is mapped. The clip request may include the access token. The plurality of event analysis processes may include a facial recognition process and the event metadata may indicate that a person present in the video clip is known or unknown. The method may include receiving, by the cloud-based storage system, an indication of a public zone within a field-of-view of the streaming video camera. The plurality of event analysis processes may include a public event recognition process and the event metadata may indicate that an event occurred with the public zone. The plurality of event analysis processes may include at least one event analysis process selected from the group consisting of: a dog bark process; a glass break process; and a door knock process. The method may include receiving, by the cloud-based storage system from the external analysis system via the Internet, an authorization request. The method may include transmitting, by the cloud-based storage system to an end user device via the Internet, a sign-in request in response to the authorization request. The method may include receiving, by the cloud-based storage system from the end user device via the Internet, user credentials. The method may include, based on the user credentials, transmitting, by the cloud-based storage system to the external analysis system via the Internet, an authorization code. The method may include receiving, by the cloud-based storage system from the external analysis system via the Internet, the authorization code. The method may include, in response to receiving the authorization code, transmitting, by the cloud-based storage system to the external analysis system via the Internet, an access token. The clip request may indicate a start time for the video clip and an end time for the video clip. A start time and an end time of extracting the video clip from the video and audio stream may be based at least in part on the event metadata.

In some embodiments, a system for video clip distribution for a smart home environment is described. The system may include a streaming video camera comprising: a camera and a wireless communication interface such that the streaming video camera transmits a video stream via the wireless communication interface. The system may include a cloud-based video storage system. The system may be configured to receive, from the streaming video camera via the Internet, the video stream of the smart home environment. The system may store the video stream of the smart home environment. The system may perform a plurality of event analysis processes. Each event analysis process of the plurality of event analysis processes may analyze the stored video stream for an occurrence of a type of event. The system may store event metadata based on the performed plurality of event analysis processes. The event metadata may include: the type of event and a timestamp. The system may receive, from an external analysis system via the Internet, a clip request indicative of a particular time or time period. The system may retrieve or extract a video clip using the video stream of the smart home environment in response to the clip request and the indicated particular time or time period. The system may identify the event metadata that corresponds to the clip request based on the timestamp and the particular time or time period. The system may transmit, to the external analysis system via the Internet, the video clip and the event metadata.

Embodiments of such a system may include one or more of the following features: The cloud-based video storage system may be further configured to transmit an access token to the external analysis system. The access token may be mapped to a user account to which the streaming video camera is mapped. The clip request may include the access token. The plurality of event analysis processes may include a facial recognition process and the event metadata may indicate that a person present in the video clip is known or unknown. The plurality of event analysis processes may include at least one event analysis process selected from the group consisting of: a dog bark process; a glass break process; and a door knock process. The cloud-based video storage system may be further configured to receive, from the external analysis system via the Internet, an authorization request. The system may transmit, to an end user device via the Internet, a sign-in request in response to the authorization request. The system may receive, from the end user device via the Internet, user credentials. The system may transmit, to the external analysis system via the Internet, an authorization code based on the user credentials. The cloud-based video storage system may be further configured to receive, from the external analysis system via the Internet, the authorization code. The system, in response to receiving the authorization code, may transmit, by the cloud-based video storage system to the external analysis system via the Internet, an access token. The clip request may indicate a start time for the video clip and an end time for the video clip. A start time and an end time of extracting the video clip from the video stream may be based at least in part on the event metadata.

In some embodiments, a non-transitory processor-readable medium is described. The non-transitory processor-readable medium may include processor-readable instructions. The instructions may be configured to cause one or more processors to receive, from a streaming video camera via the Internet, a video stream of a smart home environment. The one or more processors may store the video stream of the smart home environment. The one or more processors may perform a plurality of event analysis processes. Each event analysis process of the plurality of event analysis processes may analyze the stored video stream for an occurrence of a type of event. The one or more processors may store event metadata based on the performed plurality of event analysis processes. The event metadata may include: the type of event and a timestamp. The one or more processors may receive, from an external analysis system via the Internet, a clip request indicative of a time or time period. The one or more processors may retrieve or extract a video clip based on the video stream of the smart home environment in response to the clip request. The one or more processors may identify the event metadata that corresponds to the clip request based on the timestamp. The one or more processors may transmit, to the external analysis system via the Internet, the video clip and the event metadata.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
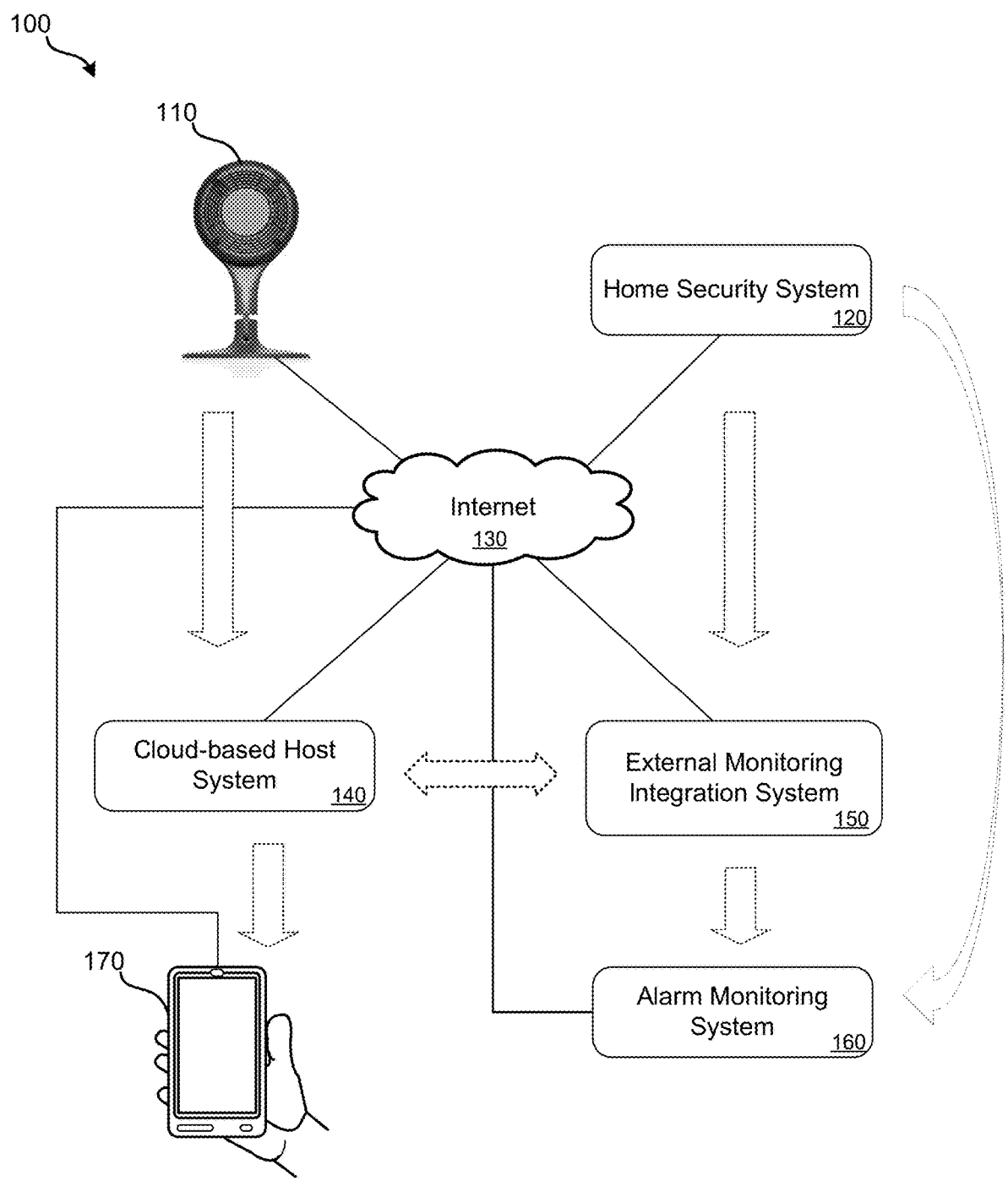
FIG. 1 illustrates an embodiment of a video clip distribution system for a smart home environment.

By a person having home automation devices and/or alarm systems from different service providers installed in a structure, information that may be useful in combination for assessing whether an emergency situation, such as a break-in, robbery, fire, flood, carbon monoxide leak, power outage, or some other emergency condition, may be provided to different remote service providers. This separation of information may make it difficult for an alarm monitoring company to accurately determine whether an emergency is occurring or a false alarm is present. As an example, an alarm system may be linked with a security monitoring service that involves a person assessing whether security or first responders (e.g., police, firefighters) should be dispatched to a home. The signal from the alarm system may indicate that a back door was opened while an alarm system was activated. Without any special arrangement being made, access to video captured by a streaming video camera hosted by a different provider may be unavailable. Such video of the vicinity, if available to the security monitoring service, could, for example, show that the door was merely left ajar and a gust of wind caused the door to swing open. Therefore, the ability to integrate video streaming services hosted by a first service provider with security services provided by a second service provider may help provide particularly effective security monitoring.

Streaming video services may be hosted by a provider that provides advanced video and audio analysis and monitoring features. The video stream and audio stream (which may be parts of a same data stream or distinct streams) received from a streaming video camera may be continuously analyzed for the occurrence of particular events. For instance, a cloud-based video streaming service may monitor received video and audio for events such as: movement, person detection, facial recognition, vehicle detection, and/or particular sounds (e.g., glass breaking, a door knock, a doorbell ring, a baby crying, etc.). In addition to raw audio and video, indications of such events could be useful in helping a security monitoring service determine whether an emergency condition is present. For instance, if an alarm is triggered by a door being opened, the security monitoring service may need to determine whether to dispatch security or first responders to a home. Review of video that was captured coincident with the alarm may show a person using a key to enter the home. By itself, this may leave the representative of the security monitoring service conflicted because the person did not disable the alarm but did have a key to enter the home. However, for example, the video streaming service provider may perform facial recognition and determine that the person is a "known" visitor that has visited the home while authorized users are present. The security monitoring service being provided with such information may help the security monitoring service determine that an emergency condition is unlikely to be present and may decide not to dispatch security or first responders.

Embodiments detailed herein disclose the creation and distribution of event metadata based on the analysis of a video and/or audio stream obtained from a home automation device or smart-home device located within or outside of a home. For instance, a dedicated streaming video camera, which may or may not also capture and stream audio, may transmit a video stream and/or audio stream to a service provider linked with the streaming video camera (e.g., a cloud-based service hosted by or affiliated with the manufacturer of the streaming video camera). This service provider may continuously, periodically, or occasionally analyze the video stream and/or audio stream for the occurrence of particular events. An indication of such events may be timestamped and stored as linked with the video and/or audio stream (and/or linked with a user account with which the video stream is linked). When a video clip is provided to an external destination, such as a system linked with a security monitoring service, event metadata that identifies one or more events that occurred contemporaneously with the video clip or within a defined period of time before a start time or after an end time of the video clip may be provided to the security monitoring service to help the security monitoring service assess whether an emergency situation is present. As such, by such event metadata being provided, the security monitoring service can take advantage of the advanced video and/or audio processing performed by the streaming video service provider. By such event metadata being provided an external monitoring service, the technical advantage of information computed about events occurring in video and/or audio being provided to the external monitoring service is realized without having the external monitoring service having to re-perform such computation or have the video and/or audio analyzed manually.

Detail regarding such embodiments is provided in relation to the figures. FIG. 1 illustrates an embodiment of a video clip distribution system 100 for a smart home environment. System 100 that can include: streaming video camera 110, home security system 120, Internet 130, cloud-based host system 140, external monitoring integration system 150, alarm monitoring system 160, and end-user device 170. Streaming video camera 110 may capture a video stream of a field-of-view of streaming video camera 110 and, possibly, an audio stream of the environment nearby streaming video camera 110. Streaming video camera 110 may communicate via a wired or wireless communication protocol with a local area network present at a location at which streaming video camera 110 is installed. Streaming video camera 110 may communicate via such a local area network (e.g., a wireless local area network) and Internet 130 to transmit a video stream and/or audio stream to cloud-based host system 140. Streaming video camera 110 may be installed indoors or outdoors. Streaming video camera 110 may be attached to a fixed location or may be movable, such as situated atop a pedestal that can be placed on a surface. If streaming video camera 110 is wireless, streaming video camera 110 may only have an external wire to receive power from an electrical outlet. Streaming video camera 110 may have various computerized components onboard, including a wireless communication interface, one or more processors, and a computer-readable storage medium to at least temporarily store video and audio data. In some embodiments, video and audio captured by streaming video camera 110 may be analyzed locally. It should be understood that one or more of the various processes detailed in relation to event analysis engines 220 may be performed locally by streaming video camera 110.

Cloud-based host system 140 may receive a video stream and, possibly, an audio stream from streaming video camera 110 via Internet 130. This received video stream and audio stream may be linked with a particular user account with which streaming video camera 110 has been linked. Cloud-based host system 140 may store the received video and audio stream and/or may relay the video and/or audio stream via Internet 132 to an end-user device, such as end-user device 170. Therefore, via end-user device 170, a user authorized to access the user account may view live or previously-recorded video and listen to live or previously-recorded audio stored by cloud-based host system 140 from streaming video camera 110. Cloud-based host system 140 may also perform various video and audio analysis processes to detect particular events that may be of interest to a user. Further detail regarding cloud-based host system 140 is provided in relation to embodiment 200 of FIG. 2.

Home security system 120 can represent a wired or wireless home security system that monitors various access points to a home and/or locations within or near the home. For instance, home security system 120 may include one or more window and/or door sensors. Home security system 120 may include one or more motion sensors. Home security system 120 may include a hub device, which is typically installed in a fixed location, such as attached to a wall, and is capable of receiving information from one or more external sensor units, entering and exiting an armed mode, outputting an alarm sound, and transmitting information to an alarm monitoring system 160 and/or external monitoring integration system 150. Home security system 120 may communicate via Internet 130 with alarm monitoring system 160 or may communicate via some other communication arrangement, such as via a telephone-based dial-up connection. Home security system 120 may be able to provide information from its one or more sensors to alarm monitoring system 160, such as an indication of when a door or window is opened or motion was sentenced while home security system 120 was armed. In addition or alternatively to such information being transmitted by home security system 120 to alarm monitoring system 160, home security system 120 may provide such information to external monitoring integration system 150.

External monitoring integration system 150 may be one or more computer server systems operated by an entity separate and distinct from cloud-based host system 140. External monitoring integration system 150 may be configured to communicate via the Internet with home security system 120 or via some other communication protocol, such as a telephone based dial-up connection. External monitoring integration system 150 may be configured to request video clips from cloud-based host system 140. External monitoring integration system 150 may define a time period that indicates a time at which such a video clip should begin and should end. Once external monitoring integration system 150 has been authorized to retrieve video clips linked with a particular user account or streaming video camera, a video clip request may be transmitted by external monitoring integration system 150 to cloud-based host system 140. In response, cloud-based host system 140 may provide the requested video clip. Additionally or alternatively, cloud-based host system 140 may provide metadata based on an analysis of the video and/or audio that is contained within the video clip. In some embodiments, metadata is provided to external monitoring integration system 150 by cloud-based host system 140 even if the metadata corresponds to one or more events that fall outside of the time period requested in the video clip. For instance, a threshold time period before and/or after the video clip may be established by cloud-based host system 144 external monitoring integration system 150 that indicates that, if metadata is present in such an extended time window, such metadata should be provided in response to the video clip request to external monitoring integration system 150.

External monitoring integration system 150 may serve as an intermediary that receives alarm notifications and can retrieve video clips, audio clips, and/or metadata from cloud-based host system 140. Therefore, external monitoring integration system 150 may receive an alarm notification as a "push" from home security system 120 and, in response, may "pull" video clips, audio clips, and/or metadata from cloud-based host system 140. External monitoring integration system 150 may serve to link and bundle received video clips, metadata, and alarm information from home security system 120. Therefore, external monitoring integration system 150 may receive an indication of an alarm or other emergency condition from home security system 120. External monitoring integration system 150 may then, in response to receiving such alarm information, determine a linked user account or streaming video camera, and transmit a message requesting a video clip for a time period corresponding to the indication of the alarm or other emergency condition from home security system 120. External monitoring integration system 150 may then bundle the received video clip, metadata, and alarm information from home security system 120 and forward the bundle of information to alarm monitoring system 160 for action (e.g., the review and potential dispatching of security or first responders).

Alarm monitoring system 160 may be operated by a security monitoring service that has staff that analyzes received data to determine if first responders or security personnel should be dispatched to the home at which streaming video camera 110 and home security system 120 is located. Using alarm monitoring system 160, staff may analyze the received bundle of information to determine if an emergency condition is likely occurring. Alarm monitoring system 160 may include one or more computer servers or systems that can present and analyze the bundle of information received from external monitoring integration system 150.

End-user device 170 can represent any computerized device that allows a user to access cloud-based host system 140 via Internet 130. For example, end-user device 170 may be a smart phone, a tablet computer, a laptop computer, a desktop computer, a smart television, or any other computerized device that allows for Internet access, the launching of a web browser, and/or the installation and execution of a native application linked with cloud-based host system 140. End-user device 170 may be used to perform an authentication process to allow external monitoring integration system 150 to access cloud-based host system 140 to retrieve video clips and/or metadata. End-user device 170 may also be used by a user to access cloud-based host system 140 to view live or previously recorded video and/or audio streams obtained from streaming video camera 110.

While system 100 illustrates streaming video camera 110 as a dedicated video and, possibly, audio streaming device, it should be understood that streaming video and/or audio capabilities may be incorporated as part of various types of smart home devices. For example, a smart home doorbell, smart thermostat, smart smoke detector, smart carbon monoxide detector, or home assistance device may have integrated video and audio streaming capabilities. The functionality of streaming video camera 110 may be performed by such smart home devices rather than using dedicated streaming video device 110.

Figure 2:
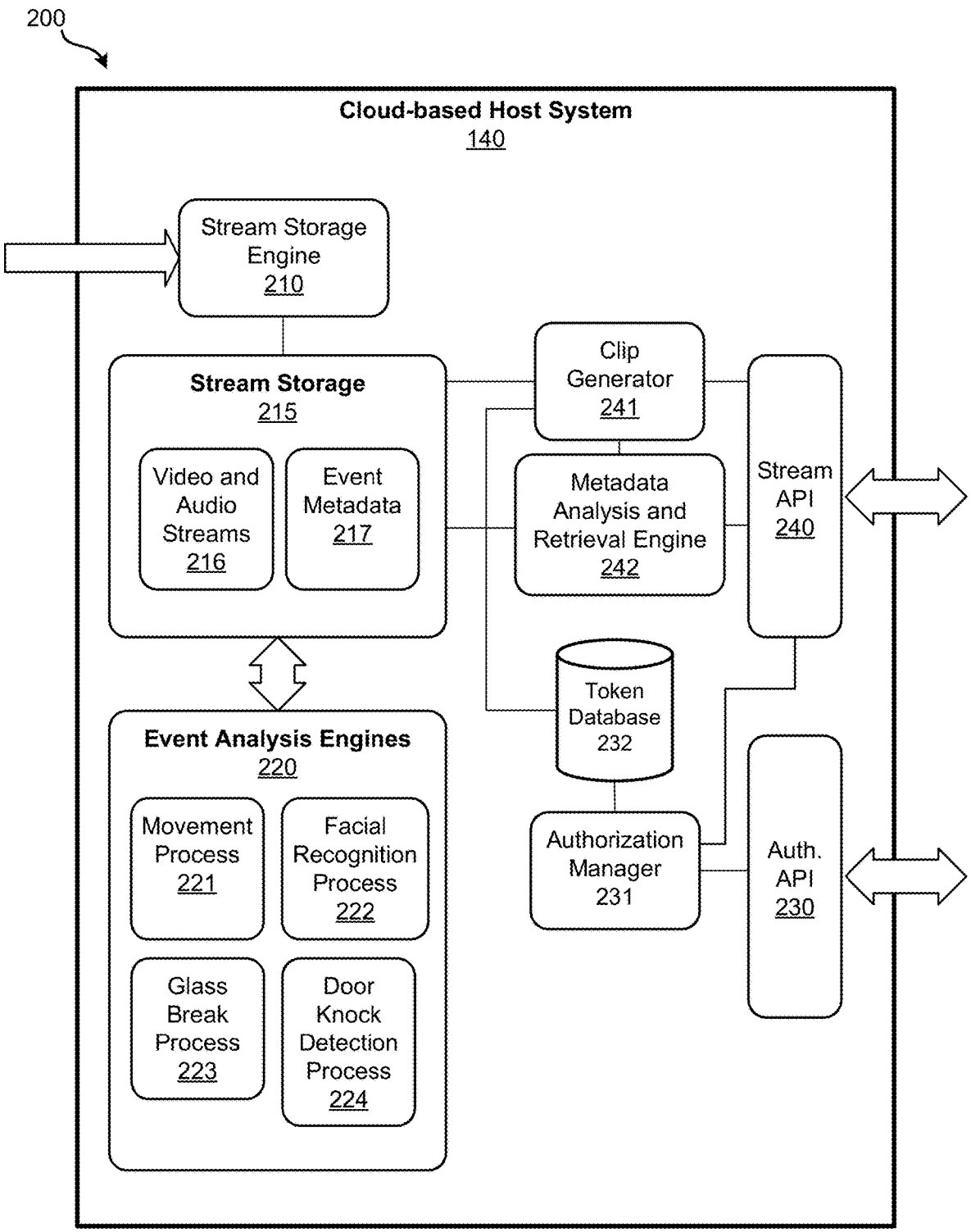
FIG. 2 illustrates an embodiment of a cloud-based host system that hosts video streaming services.

FIG. 2 illustrates an embodiment 200 of cloud-based host system 140 that hosts video streaming services. Cloud-based host system 140 may include: stream storage engine 210, stream storage 215, event analysis engines 220, authentication API (application programming interface) 230, authorization manager 231, token database 232, stream API 240, clip generator 241, and metadata analysis and retrieval engine 242. Stream storage engine 210 may serve to receive video and, possibly audio streams from streaming video cameras, such as streaming video camera 110 of FIG. 1. A received video stream may be linked with a particular user account. Stream storage engine 210 may store the received video and audio stream to video and audio streams 216 of stream storage 215. Stream storage 215 may represent a database of video and audio streams linked with various user accounts. Stream storage 215 may include multiple non-transitory computer-readable mediums, such as hard drives and solid-state drives. Received video and audio streams for at least a predefined amount of time based on a subscription linked with the user account, such as a rolling window of seven days or a month. After such a time, video and audio may be deleted, possibly along with any corresponding metadata.

Event analysis engines 220 may analyze video and/or audio streams received by stream storage engine 210 as such streams are received or after video and audio streams have been stored to stream storage 215. Event analysis engines 220 may be various algorithms or processes that are configured to identify particular events based on characteristics of the video and/or audio. By way of example, four such possible processes are illustrated as part of embodiment 200. Movement process 221 may analyze a video stream to determine if movement is present. Movement process 221 may be performed by analyzing a change in pixel values across the camera's field of view over a series of frames. Facial recognition process 222 may analyze any face that is sufficiently close to the camera capturing the received video stream. Facial recognition process 222 has access to a database of mappings of faces that have been previously captured by the streaming video camera. Facial recognition process 222 may be trained to recognize the faces of authorized users using this database. By a new face being detected in proximity, either in time or distance, to the face of an authorized user, it may be inferred that the new face belongs to a person who is known to the authorized user. In some embodiments, a same face being detected at least a threshold number of times may result in the face being qualified as belonging to a known person. As such, facial recognition process 222 may be able to identify: the presence of a face; whether the face is of a person who is known or unknown to an authorized user of the account; and/or the identity of the person to whom the face belongs. Glass break process 223 may analyze a received audio stream for a sound profile (e.g., in duration and frequency) that matches a sound profile of breaking glass. Door knock detection process 224 may analyze the received video stream for a sound profile that matches the profile of a knock on the door. A similar process may be performed for a doorbell ring. In some embodiments, door knocked detection process 224 may monitor for a door being swung open.

These four processes represent examples of various types of processes that may be performed by event analysis engines 220. Other possible event analysis engines can include: a dog bark analysis process, a baby cry detection process, a vehicle detection process, a license plate detection process, a person/activity detection process (e.g., detecting that a person is running, walking, arriving, leaving, etc.). Another possible process may be determining whether an event corresponds to a region indicated by a user as public or private. For example, a video stream may capture video of a region that corresponds to a public area in which any person is permitted to be (such as a sidewalk or walking trail). Such a process may be able to determine whether a particular event or activity occurred in the portion of the camera's field of view that corresponds to the private region or the public region. For example, a baby crying in the public region may be a significantly smaller concern than a baby crying in a private region.

Each of the processes detailed in relation to event analysis engines 220 may create metadata. This metadata may indicate a timestamp that corresponds to the time within the video and/or audio stream at which the event was detected. The metadata may also indicate the type of event and, possibly, particular characteristics of the event. For instance, a glass break event may be labeled as either a minor or major glass break along with an approximate location. Metadata created by any of the processes of event analysis engines 220 may be stored as event metadata 217. Event metadata 270 may be mapped to a particular video and audio stream of video and audio streams 216. Such event metadata 270 may trigger a notification being transmitted to an end-user device that is linked with the user account. For instance, an end-user device, such as end-user device 170 of FIG. 1, may receive a push notification that glass breaking was detected in a video stream linked with the user account.

Event analysis engines 220 may be executed by cloud-based host system 140. In some embodiments, one or more of the various processes of event analysis engines 220 may be performed directly by one or more processors incorporated as part of a streaming video camera. Such a distributed computing arrangement may decrease an amount of processing needed to be performed by cloud-based host system 140. If such processing is performed by the streaming video camera, metadata generated based on such processing may be transmitted to stream storage engine 210 for storage as event metadata 217.

Authentication API 230 may receive an authorization request from external monitoring integration system 150. Since external monitoring integration system 150 may be hosted by an entity separate and distinct from the entity hosting cloud-based host system 140, proper permissions may be needed by an external monitoring integration system 150 in order to access a video clip and/or metadata. Authentication API 230 may receive such a request from external monitoring integration system 150. Authorization manager 231 may analyze a received authorization request and create an access token if authorization manager 231 determines that external monitoring integration system 150 should be authorized to access a particular video and/or audio stream. A created access token may be provided to the external monitoring integration system 150 and may also be stored to token database 232. For at least a predetermined amount of time, external monitoring integration system 150 may use the token to access stream API 240 and retrieve a video clip and/or metadata. Further detail regarding such token creation and authorization is provided in relation to FIG. 4.

Stream API 240 may receive a request from external monitoring integration system 150 for a video clip and/or metadata. The request may indicate a start time and an end time. In other embodiments, the request may indicate a single point in time and clip generator 241 and/or metadata analysis and retrieval engine 242 may determine the particular start time and end time for the video clip and/or metadata. Authorization manager 231 may confirm that a token included in the request is valid by consulting token database 232. This token may also be used to determine which user account and/or video stream the external monitoring integration system 150 is attempting to access.

If authorization is granted, clip generator 241 may retrieve an appropriate portion of the video and/or audio stream from video and audio streams 216 based on the received request. Clip generator 241 may adjust the resolution and frame rate and encoding to be in a particular format indicated in the received request. The request may specify whether metadata is to be included in the response or excluded. Metadata analysis and retrieval engine 242 may retrieve from event metadata 217 any metadata that corresponds to the time period of the requested video clip. Metadata analysis and retrieval engine 242 may analyze whether any metadata is present for a predetermined amount of time before or after the requested time period of the requested video clip. If so, such metadata may also be included in the response to the request. For example, a face being recognized seconds before the start of the time period of the requested video clip may be relevant to a security monitoring service determining if an emergency situation is present.

In some embodiments, clip generator 241 may generate video clips independent of a specific request. Rather, video clips may be generated by clip generator 241 based on an event being detected or video clips may be generated for some or all time periods. Such video clips may be stored in a video clip database for future retrieval, such as in response to a request. Audio may be incorporated as part of such video clips or may be stored and retrieved separately.

In some embodiments, metadata analysis and retrieval engine 242 may have the ability to adjust the start and end times of video and/or audio clips provided to external monitoring integration system 150 based on stored event metadata. For example, if within a threshold period of time before or after the time period of a requested video and/or audio clip, metadata analysis and retrieval engine 242 identifies event metadata corresponding to the video and/or audio stream, the video and/or audio clip may be lengthened or the time period may be altered to include the event corresponding to the event metadata. That is, due to such event metadata being linked with the video and/or audio stream at a time within a threshold time duration outside of the start or end of the requested video and/or audio clip, the video and/or audio clip may be extended to include the portion of the video and/or audio stream corresponding to the event metadata.

Figure 3:
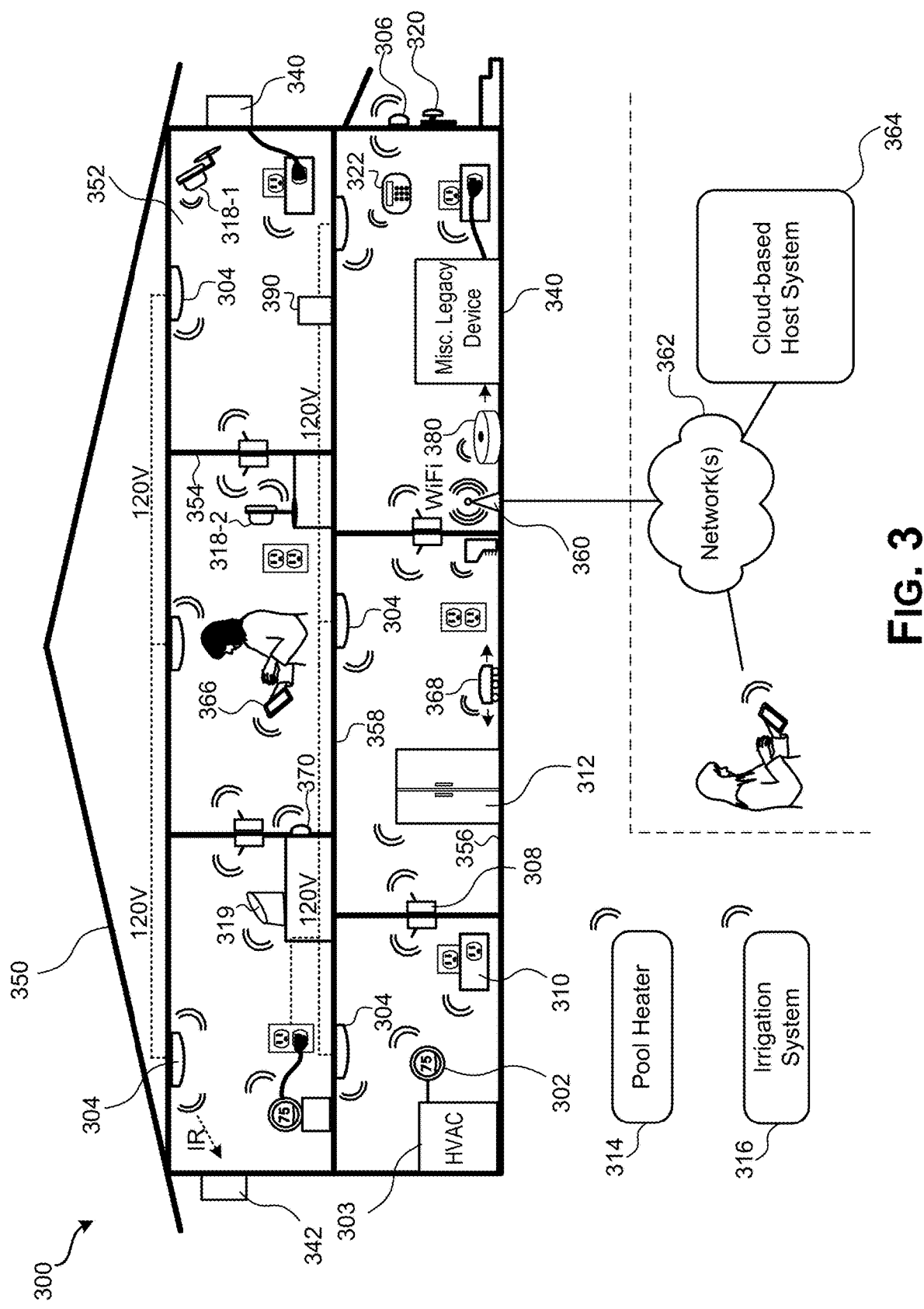
FIG. 3 illustrates an embodiment of a home automation environment.

A streaming video camera may be incorporated as part of a smart home environment. FIG. 3 illustrates an embodiment of smart home environment 300. Further, as previously noted, a streaming video camera and/or audio device may be incorporated as part of some other smart home device, such as those detailed in relation to smart home environment 300.

The smart home environment 300 includes a structure 350 (e.g., a house, office building, garage, or mobile home) with various integrated devices. It will be appreciated that devices may also be integrated into a smart home environment 300 that does not include an entire structure 350, such as an apartment, condominium, or office space. Further, the smart home environment 300 may control and/or be coupled to devices outside of the actual structure 350. Indeed, several devices in the smart home environment 300 need not be physically within the structure 350. For example, a device controlling a pool heater 314 or irrigation system 316 may be located outside of the structure 350.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 350 includes a plurality of rooms 352, separated at least partly from each other via walls 354. The walls 354 may include interior walls or exterior walls. Each room may further include a floor 356 and a ceiling 358. Devices may be mounted on, integrated with and/or supported by a wall 354, floor 356 or ceiling 358.

In some implementations, the integrated devices of the smart home environment 300 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 300 may include one or more intelligent, multi-sensing, network-connected thermostats 302 (hereinafter referred to as "smart thermostats 302"), one or more intelligent, network-connected, multi-sensing hazard detection units 304 (hereinafter referred to as "smart hazard detectors 304"), one or more intelligent, multi-sensing, network-connected entryway interface devices 306 and 320 (hereinafter referred to as "smart doorbells 306" and "smart door locks 320"), and one or more intelligent, multi-sensing, network-connected alarm systems 322 (hereinafter referred to as "smart alarm systems 322").

In some implementations, the one or more smart thermostats 302 detect ambient climate characteristics (e.g., temperature and/or humidity) and control an HVAC system 303 accordingly. For example, a respective smart thermostat 302 includes an ambient temperature sensor.

The one or more smart hazard detectors 304 may include thermal radiation sensors directed at respective heat sources (e.g., a stove, oven, other appliances, a fireplace, etc.). For example, a smart hazard detector 304 in a kitchen 353 includes a thermal radiation sensor directed at a stove/oven 312. A thermal radiation sensor may determine the temperature of the respective heat source (or a portion thereof) at which it is directed and may provide corresponding blackbody radiation data as output.

The smart doorbell 306 and/or the smart door lock 320 may detect a person's approach to or departure from a location (e.g., an outer door), control doorbell/door locking functionality (e.g., receive user inputs from a portable electronic device 366-1 to actuate the bolt of the smart door lock 320), announce a person's approach or departure via audio or visual means, and/or control settings on a security system (e.g., to activate or deactivate the security system when occupants go and come). In some implementations, the smart doorbell 306 includes some or all of the components and features of the camera 318-1. In some implementations, the smart doorbell 306 includes a camera 318-1, and therefore, is also called "doorbell camera 306" in this document. Cameras 318-1 and/or 318-2 may function as the streaming video camera and streaming audio device detailed in relation to various embodiments herein. Cameras 318 may be mounted in a location, such as indoors and to a wall. Camera 318-2 may function similarly to camera 318-1, but may be placed on a surface. Various embodiments of cameras 318 may be installed indoors or outdoors.

The smart alarm system 322 may detect the presence of an individual within close proximity (e.g., using built-in IR sensors), sound an alarm (e.g., through a built-in speaker, or by sending commands to one or more external speakers), and send notifications to entities or users within/outside of the smart home network 300. In some implementations, the smart alarm system 322 also includes one or more input devices or sensors (e.g., keypad, biometric scanner, NFC transceiver, microphone) for verifying the identity of a user, and one or more output devices (e.g., display, speaker). In some implementations, the smart alarm system 322 may also be set to an armed mode, such that detection of a trigger condition or event causes the alarm to be sounded unless a disarming action is performed. In embodiments detailed herein, an alarm system may be linked with a service provider other than a provider of cameras 318. As such, remote services provided by the alarm system may be provided by an entity that does not provide the video and/or audio storage and analysis.

In some implementations, the smart home environment 300 includes one or more intelligent, multi-sensing, network-connected wall switches 308 (hereinafter referred to as "smart wall switches 308"), along with one or more intelligent, multi-sensing, network-connected wall plug interfaces 310 (hereinafter referred to as "smart wall plugs 310"). The smart wall switches 308 may detect ambient lighting conditions, detect room-occupancy states, and control a power and/or dim state of one or more lights. In some instances, smart wall switches 308 may also control a power state or speed of a fan, such as a ceiling fan. The smart wall plugs 310 may detect occupancy of a room or enclosure and control supply of power to one or more wall plugs (e.g., such that power is not supplied to the plug if nobody is at home).

In some implementations, the smart home environment 300 of FIG. 3 includes a plurality of intelligent, multi-sensing, network-connected appliances 312 (hereinafter referred to as "smart appliances 312"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 340, such as old conventional washer/dryers, refrigerators, and the like, which may be controlled by smart wall plugs 310. The smart home environment 300 may further include a variety of partially communicating legacy appliances 342, such as infrared ("IR") controlled wall air conditioners or other IR-controlled devices, which may be controlled by IR signals provided by the smart hazard detectors 304 or the smart wall switches 308.

In some implementations, the smart home environment 300 includes one or more network-connected cameras 318 that are configured to provide video monitoring and security in the smart home environment 300. The cameras 318 may be used to determine occupancy of the structure 350 and/or particular rooms 352 in the structure 350, and thus may act as occupancy sensors. For example, video captured by the cameras 318 may be processed to identify the presence of an occupant in the structure 350 (e.g., in a particular room 352). Specific individuals may be identified based, for example, on their appearance (e.g., height, face) and/or movement (e.g., their walk/gait). Cameras 318 may additionally include one or more sensors (e.g., IR sensors, motion detectors), input devices (e.g., microphone for capturing audio), and output devices (e.g., speaker for outputting audio). In some implementations, the cameras 318 are each configured to operate in a day mode and in a low-light mode (e.g., a night mode). In some implementations, the cameras 318 each include one or more IR illuminators for providing illumination while the camera is operating in the low-light mode. In some implementations, the cameras 318 include one or more outdoor cameras. In some implementations, the outdoor cameras include additional features and/or components such as weatherproofing and/or solar ray compensation.

The smart home environment 300 may additionally or alternatively include one or more other occupancy sensors (e.g., the smart doorbell 306, smart door locks 320, touch screens, IR sensors, microphones, ambient light sensors, motion detectors, smart nightlights 370, etc.). In some implementations, the smart home environment 300 includes radio-frequency identification (RFID) readers (e.g., in each room 352 or a portion thereof) that determine occupancy based on RFID tags located on or embedded in occupants. For example, RFID readers may be integrated into the smart hazard detectors 304.

The smart home environment 300 may also include communication with devices outside of the physical home but within a proximate geographical range of the home. For example, the smart home environment 300 may include a pool heater monitor 314 that communicates a current pool temperature to other devices within the smart home environment 300 and/or receives commands for controlling the pool temperature. Similarly, the smart home environment 300 may include an irrigation system 316 that communicates information regarding irrigation systems within the smart home environment 300 and/or receives control information for controlling such irrigation systems.

Smart home assistant 319 may have one or more microphones that continuously listen to an ambient environment. Smart home assistant 319 may be able to respond to verbal queries posed by a user, possibly preceded by a triggering phrase. Smart home assistant 319 may stream audio and, possibly, video if a camera is integrated as part of the device, to a cloud-based host system 364.

By virtue of network connectivity, one or more of the smart home devices of FIG. 3 may further allow a user to interact with the device even if the user is not proximate to the device. For example, a user may communicate with a device using a computer (e.g., a desktop computer, laptop computer, or tablet) or other portable electronic device 366 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 300 using a network-connected computer or portable electronic device 366. In some examples, some or all of the occupants (e.g., individuals who live in the home) may register their device 366 with the smart home environment 300. Such registration may be made at a central server to authenticate the occupant and/or the device as being associated with the home and to give permission to the occupant to use the device to control the smart devices in the home. An occupant may use their registered device 366 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 366, the smart home environment 300 may make inferences about which individuals live in the home and are therefore occupants and which devices 366 are associated with those individuals. As such, the smart home environment may "learn" who is an occupant and permit the devices 366 associated with those individuals to control the smart devices of the home.

In some implementations, in addition to containing processing and sensing capabilities, devices 302, 304, 306, 308, 310, 312, 314, 316, 318, 320, and/or 322 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 360) to a network, such as the Internet. Through the Internet, the smart devices may communicate with a cloud-based host system 364 (also called a cloud-based server system, central server system, and/or a cloud-computing system herein), which represents an embodiment of cloud-based host system 140 of FIGS. 1 and 2. Cloud-based server system 364 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 364 to smart devices (e.g., when available, when purchased, or at routine intervals).

In some implementations, the network interface 360 includes a conventional network device (e.g., a router), and the smart home environment 300 of FIG. 3 includes a hub device 380 that is communicatively coupled to the network(s) 362 directly or via the network interface 360. The hub device 380 is further communicatively coupled to one or more of the above intelligent, multi-sensing, network-connected devices (e.g., smart devices of the smart home environment 300). Each of these smart devices optionally communicates with the hub device 380 using one or more radio communication networks available at least in the smart home environment 300 (e.g., ZigBee, Z-Wave, Insteon, Bluetooth, Wi-Fi and other radio communication networks). In some implementations, the hub device 380 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols—and is configured to streamline adding of new devices and commissioning of the hub device. In some implementations, hub device 380 further includes a local storage device for storing data related to, or output by, smart devices of smart home environment 300. In some implementations, the data includes one or more of: video data output by a camera device, metadata output by a smart device, settings information for a smart device, usage logs for a smart device, and the like.

In some implementations, smart home environment 300 includes a local storage device 390 for storing data related to, or output by, smart devices of smart home environment 300. In some implementations, the data includes one or more of: video data output by a camera device (e.g., cameras 318 or doorbell camera 306), metadata output by a smart device, settings information for a smart device, usage logs for a smart device, and the like. In some implementations, local storage device 390 is communicatively coupled to one or more smart devices via a smart home network (e.g., smart home network 202, FIG. 2). In some implementations, local storage device 390 is selectively coupled to one or more smart devices via a wired and/or wireless communication network. In some implementations, local storage device 390 is used to store video data when external network conditions are poor. For example, local storage device 390 is used when an encoding bitrate of cameras 318 exceeds the available bandwidth of the external network (e.g., network(s) 362). In some implementations, local storage device 390 temporarily stores video data from one or more cameras (e.g., cameras 318) prior to transferring the video data to a server system (e.g., server system 364).

Further included and illustrated in the exemplary smart-home environment 300 of FIG. 3 are service robots 368, each configured to carry out, in an autonomous manner, any of a variety of household tasks. For some embodiments, the service robots 368 can be respectively configured to perform floor sweeping, floor washing, etc. in a manner similar to that of known commercially available devices such as the Roomba™ and Scooba™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 368 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks. Further, such service robots may have one or more cameras and/or microphones that enable service robots 368 to stream video and/or audio to cloud-based host system 364.

When serving as a localized air monitor/purifier for an occupant, a particular service robot 368 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 368 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 368, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 368 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 368 can be advised by other smart-home sensors that the temperature and humidity levels are rising in the kitchen, which is nearby the occupant's current dining room location, and responsive to this advisory, the hazard detector service robot 368 will temporarily raise a hazard detection threshold, such as a smoke detection threshold, under an inference that any small increases in ambient smoke levels will most likely be due to cooking activity and not due to a genuinely hazardous condition.

Figure 4:
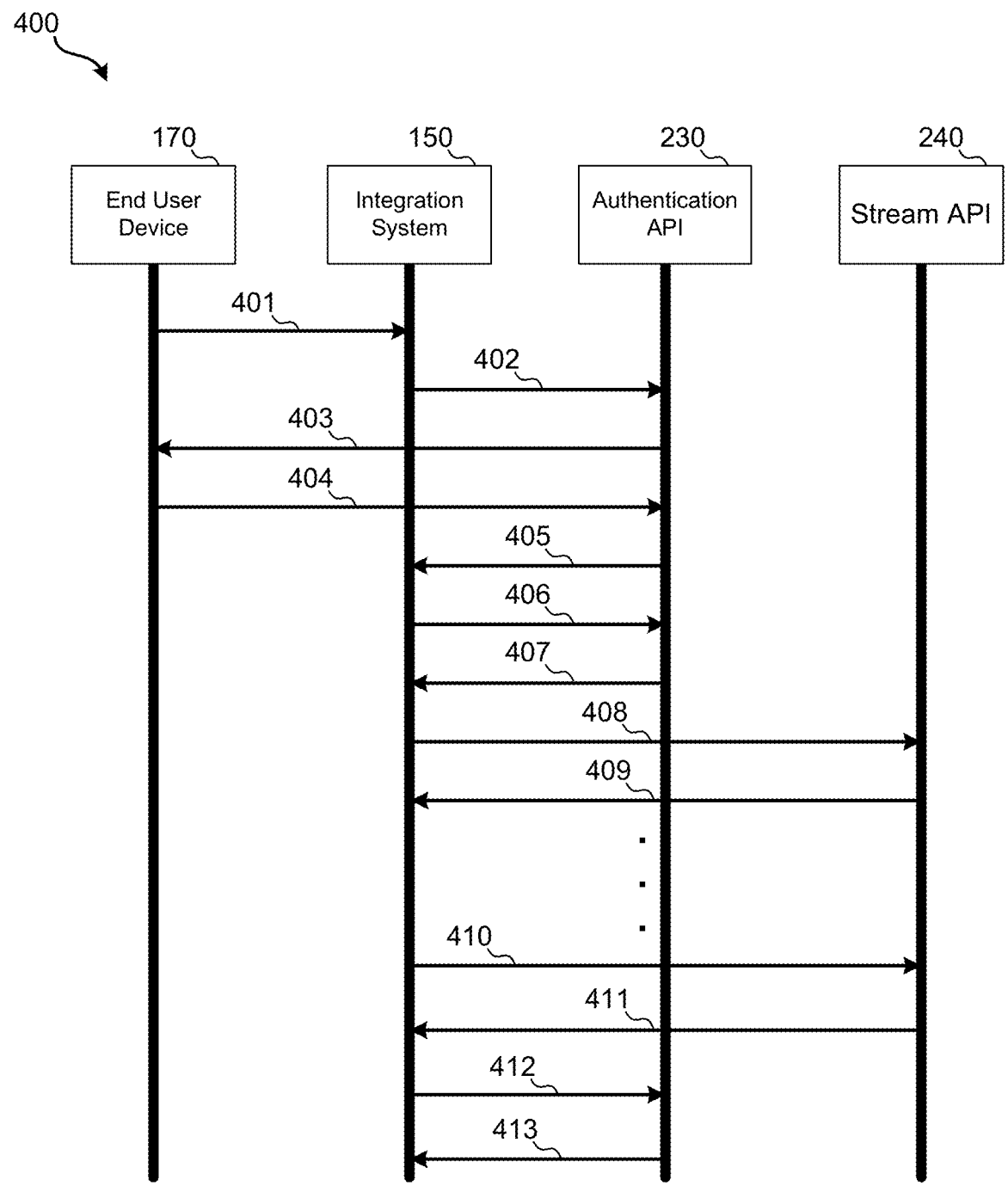
FIG. 4 illustrates an embodiment of a swim diagram of communications related to authorizing and providing a video clip with metadata to an external integration system.

FIG. 4 illustrates an embodiment 400 of a swim diagram of communications related to authorizing and providing a video clip with metadata to an external integration system. Communication 401 may be transmitted from end user device to external monitoring integration system 150 ("integration system 150"). Communication 401 may be a request to integrate services provided by external monitoring integration system 150 with a streaming video and/or audio service that the end user receives through another provider.

In response to the request of communication 401, integration system 150 may transmit a request for authorization code to authentication API 230. Integration system 150 may determine that authentication API 230 is associated with the provider that hosts the video and audio streaming services of a device of the end-user. That is, based on the request of communication 401, the appropriate video and audio stream provider may be identified. In response to communication 402, authentication API 230 may send communication 403 which causes a prompt to provide authentication credentials and consent to be presented by end-user device 170. The prompts to provide authentication credentials and consent may be provided in the form of a webpage presented by end-user device 170 or as one or more prompts within a native application being executed by end-user device 170. Authentication credentials and consents may be confirmed by end-user device 170 as part of communication 404 to authentication API 230. An authentication manager, such as authorization manager 231, may then authenticate the credentials received as part of communication 404.

In response to the credentials being authenticated, authentication API 230 may transmit an authorization code as part of communication 405 to integration system 150. This authorization code may be stored by integration system 150 and may be used to request access and a token from authentication API 230 as part of communication 406. In response to communication 406 and authorization manager 231 validating the authorization code, a token may be provided to integration system 150 as part of communication 407.

Using the token, integration system 150 can request a video clip from stream API 240. Communication 408 may include: the request for the video clip, a time period for the video clip, an indication of a particular streaming video camera, and the token. Communication 408 may also include a request for all or specific types of metadata associated with the time period requested for the video clip. In response, communication 409 may be transmitted by stream API 240 to integration system 150. Communication 409 may include the requested video and/or audio clip and, if present (and, possibly, requested), any metadata linked with the requested video and/or audio clip. In some embodiments, metadata that corresponds to within a predetermined amount of time before or after the requested video and/or audio clip may be provided as part of communication 409.

Communication 409 may include one or more instances of metadata that are linked with the time period of the requested video and/or audio clip. Such metadata may be retrieved from event metadata 217 as created by event analysis engines 220. Such metadata may be provided in a defined format. For example metadata may be transmitted in the form of: <Event Type>; <Event Parameter>; <Event Location>; <Time of Event>, <Public/Private Region>.

Such an event metadata message may include the type of event (e.g., facial recognition, glass break). Depending on the event type, one or more event parameters may be linked with the event type. For example, for a facial recognition event, a first parameter may indicate whether the person detected is likely known or unknown to an authorized user. For a glass break event, a parameter may indicate the detected severity of the break. Event location may indicate an estimated location of where the event occurred, such as inside or outside, or a distance from a streaming video and/or audio camera. The time of the event may indicate a discrete time or time range over which the event was detected. An indication of public or private may indicate whether the event likely occurred in a region that has been defined as public by an authorized user or is within the private region as defined by the authorized user. It should be understood that the format given for the metadata is merely an example; various other formats that include additional or fewer data fields may be possible.

After an amount of time passing, the token provided by authentication API 230 to integration system 150 as part of communication 407 may expire. Communication 410 may be a request from integration system 150 to stream API 240 for a video and/or audio clip. This request may be denied due to the token having expired. Communication 411 may indicate that the request as part of communication 410 is unauthorized. In response, integration system 150 may request a refreshed token from authentication API 230 as part of communication 412. This request may use the authentication code provided to integration system 150 as part of communication 405. As part of communication 413, authentication API 230 may provide a new or refreshed token to integration system 150 for use in requesting future video and/or audio clips and/or metadata associated with such video and/or audio clips.

Figure 5:
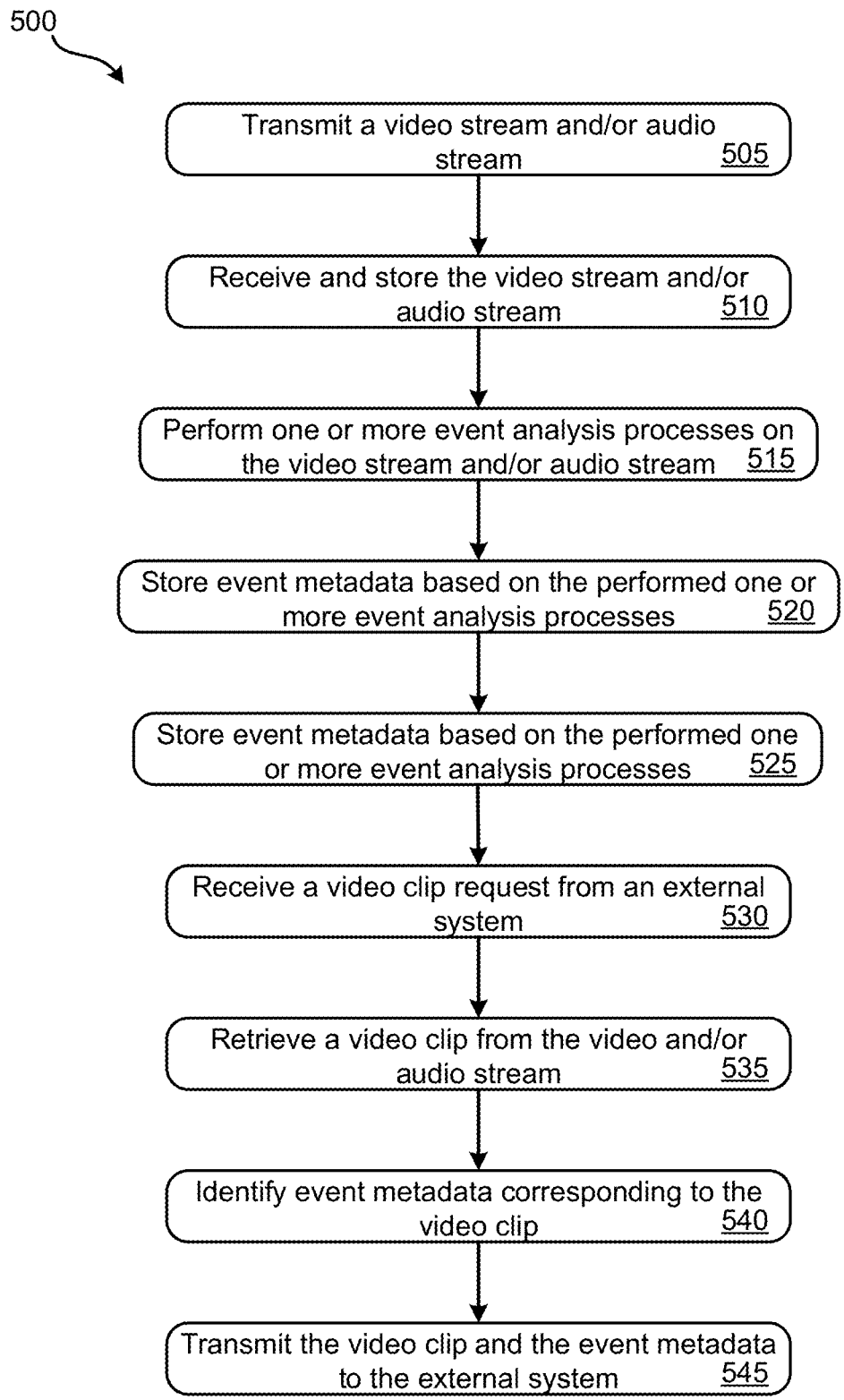
FIG. 5 illustrates an embodiment of a method of a video clip distribution system for a smart home environment.

Various methods may be performed using the systems and communication arrangements detailed in relation to FIGS. 1-4. FIG. 5 illustrates an embodiment of a method 500 of video clip distribution system for a smart home environment. Method 500 may be performed using system 100. At block 505, a video stream and/or audio stream may be transmitted by a streaming video and/or audio device, such as streaming video camera 110 of FIG. 1 or any of the various smart home devices detailed in relation to FIG. 3 which may have one or more cameras and/or microphones incorporated. This video and/or audio stream may be transmitted via one or more networks, possibly including local wireless networks and via the Internet, to a cloud-based host system, which may receive and store the video and/or audio streams at block 510. The video and/or audio streams may be stored as linked with a particular user account with which the device from which the video and/or audio stream was received is registered.

At block 515, event analysis engines 220 may perform one or more processes to identify events that likely occurred within the video and/or audio stream. It should be understood that event analysis engines 220 may be performed by the cloud-based host system and/or may be performed locally by the streaming video and/or audio device. Such processes may be performed as the video and/or audio is received or may be performed after the video and/or audio have been stored for an amount of time and processed later, for example, as processing resources become available at the cloud-based host system. At block 520, event metadata based on the performed one or more event analysis processes may be stored at block 525. This event metadata may indicate the timer time period over which the event occurred and details of the event that were identified as having occurred. This event metadata may be stored as linked with the video and/or audio stream which also may be stored by the cloud-based host system. For example, event metadata and video and audio streams may be stored as part of stream storage 215 using one or more non-transitory processor readable mediums as part of cloud-based host system 140.

At block 530, a request may be received from an external monitoring integration system, such as external monitoring integration system 150 for a video clip and/or audio clip. External monitoring integration system 150 may have been triggered to request the video and/or audio clip based on an indication of an alarm condition being present that has been received from home security system 120. Previously, a user may have registered a streaming video and/or audio device with external monitoring integration system 150 such that external monitoring integration system 150 is authorized to request video and/or audio clips that have been identified as linked with the location of home security system 120. The request received from external monitoring integration system 150 may include an authorization token and a request for a particular time period or point in time for the video and/or audio clip. The request may or may not specify that metadata is requested to be provided as part of the response.

At block 535, a video clip and/or audio clip may be retrieved from a video clip database or extracted from a stored video and/or audio stream, respectively, that is linked with the user account and streaming video and/or audio device is authorized to be accessed by the external monitoring integration system 150. This video clip and/or audio clip may be retrieved or extracted by clip generator 241 of cloud-based host system 140. As an example, the clip created may be 30 seconds in duration. In other embodiments, the clip may be shorter or longer duration. In some embodiments, various video clips are created and stored for later retrieval from a video clip database. Therefore, various video clips may be created independent of a video clip request being received. In other embodiments, the video clip is not extracted from the stored video stream until a video clip request is received.

At block 540, metadata analysis and retrieval engine 242 may determine if any event metadata is stored as part of event metadata 217 that corresponds to one or more events determined to have occurred based on event analysis engines 220 being executed on the received video and/or audio streams for the time period corresponding to the requested video and/or audio clip. If one or more instances of event metadata are stored as part of event metadata 217 for the time period corresponding to the requested video and/or audio clip, this metadata may be retrieved and transmitted to external monitoring integration system 150. In some embodiments, one or more instances of that metadata may occur within a predefined amount of time prior to or after the time. Requested for the video and/or audio clip, such metadata may be transmitted to external monitoring integration system 150. The threshold amount of time outside of the requested time period may vary based on the type of event metadata. For example, an unknown person being identified by facial recognition several minutes outside of the time period requested for a video and/or audio clip may result in the event metadata being provided to the external monitoring integration system; however, another sort of event, such as a baby crying, may not be reported if occurring several minutes outside of the time period requested for the video and audio clip.

At block 545, the video and/or audio clip, along with event metadata may be transmitted to the external monitoring integration system 150. In other embodiments, the event metadata, video clip, and/or audio clip are transmitted directly to an alarm monitoring system. In some embodiments, the data is bundled and transmitted by external monitoring integration system 150 to alarm monitoring system 160 or directly to a government first responder agency (e.g., police, fire department, ambulance service). Such data may be used to present an interface, such as interface 600, to one or more persons to make a decision on how best an emergency situation should be handled or whether a false alarm is present.

In some embodiments, blocks 535-545 may be performed in the absence of the request of block 530. That is, in response to particular event metadata being generated, the cloud-based host system may be triggered to generate a clip covering a particular time period that overlaps with the event and transmit the event metadata, video clip, and/or audio clip to the external system.

Figure 6:
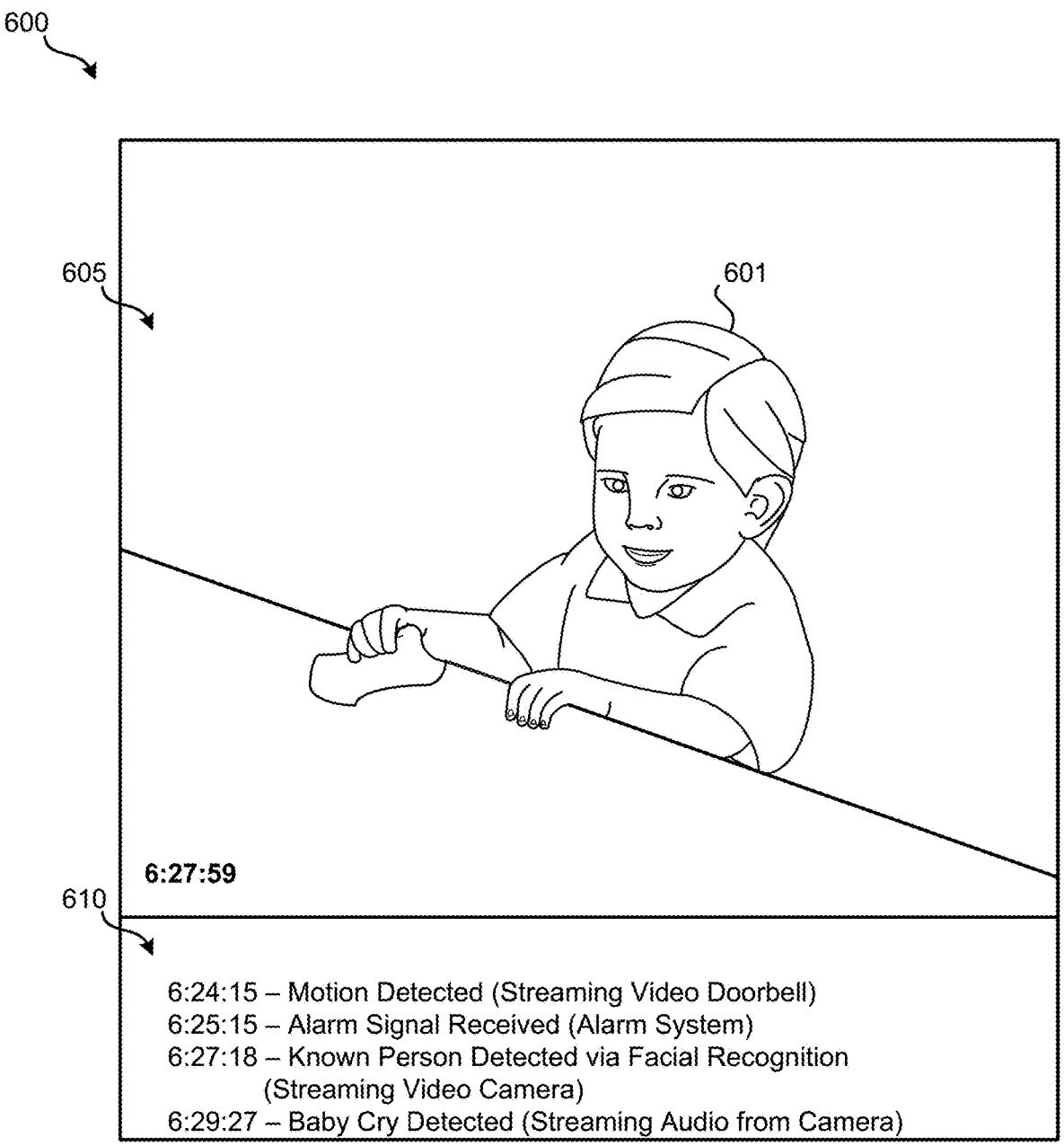
FIG. 6 illustrates an embodiment of an interface for reviewing video clips, alarm data, and streaming video metadata.

FIG. 6 illustrates an embodiment of an interface 600 for reviewing video clips, alarm data, and streaming video metadata. Interface 600 may be presented by alarm monitoring system 160 to staff that are in charge of determining whether to dispatch security services or first responders to a structure. In response to an alarm signal being received, external monitoring integration system 150 may request a video and/or audio clip and any associated metadata from cloud-based host system 140. A data bundle including information from the alarm system, a video clip, and audio clip, and/or metadata may be provided to alarm monitoring system 160. Interface 600 may include video region 605 used to present the video clip received from cloud-based host system 140. This video clip may include an amount of time prior to an amount of time following an alarm detected by home security system 120.

Region 610 may present metadata along with alarm system data for analysis by the staff. An indication of when the alarm signal was received from the alarm system is indicated as occurring at 6:25:15. As obtained from cloud-based host system 140, metadata indicating that motion was detected by a streaming video doorbell occurred at 6:24:15. Additionally, metadata indicating that a streaming video camera identified a known person using facial recognition occurred at 6:27:18. Further, a baby cry was detected at 6:29:27 based on audio from the streaming video camera. Based on this information, it may be determined that an emergency situation is not occurring because, for instance, the person detected via facial recognition was identified as known by the processing performed by cloud-based host system 140. Therefore, by at least partially relying on the metadata created by cloud-based host system 140, a decision can be made using interface 600 at alarm monitoring system 160 about whether to deploy security services and/or notify first responders.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for video clip distribution for a smart home environment, the method comprising:
    receiving, from a streaming video camera via the Internet by a cloud-based storage system, a video stream of the smart home environment;
    storing, by the cloud-based storage system, the video stream of the smart home environment;
    performing, by the cloud-based storage system, a plurality of event analysis processes, wherein each event analysis process of the plurality of event analysis processes analyzes the stored video stream for an occurrence of a type of event;
    storing, by the cloud-based storage system, event metadata based on the performed plurality of event analysis processes, wherein the event metadata comprises: the type of event and a timestamp;
    receiving, by the cloud-based storage system from an external analysis system via the Internet, an authorization request, wherein:
        the external analysis system is operated by a first entity separate and distinct from a second entity that operates the cloud-based storage system;
    transmitting, by the cloud-based storage system to an end user device via the Internet, a sign-in request in response to the authorization request;
    receiving, by the cloud-based storage system from the end user device via the Internet, user credentials; and
    based on the user credentials being authenticated, transmitting, by the cloud-based storage system to the external analysis system via the Internet, an authorization code, wherein the external analysis system stores the authorization code;
    receiving, by the cloud-based storage system, the authorization code from the external analysis system;
    transmitting, by the cloud-based storage system, an access token to the external analysis system based on receiving the authorization code, wherein the access token is mapped to the streaming video and the access token is valid for a predefined amount of time;
    receiving, from the external analysis system via the Internet, a clip request that indicates a time period and comprises the access token;
    in response to the clip request, retrieving, by the cloud-based storage system, a video clip that is created from the video stream based on the access token received as part of the clip request;
    identifying, by the cloud-based storage system, the event metadata that corresponds to the time period indicated in the clip request; and
    transmitting, by the cloud-based storage system to the external analysis system via the Internet, the video clip and the event metadata, wherein the external analysis system outputs the video clip and the event metadata with alarm information for action.

2. The method for video clip distribution of the smart home environment of claim 1, wherein the plurality of event analysis processes comprises a facial recognition process and the event metadata indicates that a person present in the video clip is known or unknown.

3. The method for video clip distribution of the smart home environment of claim 1, further comprising:
    receiving, by the cloud-based storage system, an indication of a public zone within a field-of-view of the streaming video camera, wherein the plurality of event analysis processes comprises a public event recognition process and the event metadata indicates that an event occurred within the public zone.

4. The method for video clip distribution of the smart home environment of claim 1, wherein the plurality of event analysis processes comprises at least one event analysis process selected from the group consisting of:
    a dog bark process; a glass break process; and a door knock process.

5. The method for video clip distribution of the smart home environment of claim 1, wherein the clip request indicates a start time for the video clip and an end time for the video clip.

6. The method for video clip distribution of the smart home environment of claim 1, wherein a start time and an end time of extracting the video clip from the video stream are based at least in part on the event metadata.

7. A system for video clip distribution for a smart home environment, the system comprising:
    a streaming video camera comprising: a camera and a wireless communication interface such that the streaming video camera transmits a video stream via the wireless communication interface; and
    a cloud-based video storage system configured to:
        receive, from the streaming video camera via the Internet, the video stream of the smart home environment;
        store the video stream of the smart home environment;
        perform a plurality of event analysis processes, wherein each event analysis process of the plurality of event analysis processes analyzes the stored video stream for an occurrence of a type of event;
        store event metadata based on the performed plurality of event analysis processes, wherein the event metadata comprises: the type of event and a timestamp;
        receive, from an external analysis system via the Internet, an authorization request, wherein:
            the external analysis system is operated by a first entity separate and distinct from a second entity that operates the cloud-based storage system;
        transmit, to an end user device via the Internet, a sign-in request in response to the authorization request;
        receive, from the end user device via the Internet, user credentials; and based on the user credentials being authenticated, transmit, to the external analysis system via the Internet, an authorization code, wherein the external analysis system stores the authorization code;

receive, the authorization code from the external analysis system;

transmit an access token to the external analysis system based on receiving the authorization code, wherein the access token is mapped to the streaming video and the access token is valid for a predefined amount of time;

receive, from the external analysis system via the Internet, a clip request indicative of a time period and comprises the access token;

retrieve a video clip based on the video stream of the smart home environment in response to the clip request, the access token received as part of the clip request, and the indicated time period;

identify the event metadata that corresponds to the clip request and the indicated time period based on the timestamp; and transmit, to the external analysis system via the Internet, the video clip and the event metadata, wherein the external analysis system outputs the video clip and the event metadata with alarm information for action.

8. The system for video clip distribution of the smart home environment of claim 7, wherein the plurality of event analysis processes comprises a facial recognition process and the event metadata indicates that a person present in the video clip is known or unknown.

9. The system for video clip distribution of the smart home environment of claim 7, wherein the plurality of event analysis processes comprises at least one event analysis process selected from the group consisting of: a dog bark process; a glass break process; and a door knock process.

10. The system for video clip distribution of the smart home environment of claim 7, wherein the clip request indicates a start time for the video clip and an end time for the video clip.

11. The system for video clip distribution of the smart home environment of claim 7, wherein a start time and an end time of extracting the video clip from the video stream is based at least in part on the event metadata.

12. A non-transitory processor-readable medium comprising processor-readable instructions configured to cause one or more processors to:

receive, from a streaming video camera via the Internet, a video stream of a smart home environment;

store the video stream of the smart home environment;

perform a plurality of event analysis processes, wherein each event analysis process of the plurality of event analysis processes analyzes the stored video stream for an occurrence of a type of event;

store event metadata based on the performed plurality of event analysis processes, wherein the event metadata comprises: the type of event and a timestamp;

receive, from an external analysis system via the Internet, an authorization request, wherein:

the external analysis system is operated by a first entity separate and distinct from a second entity that operates the one or more processors;

transmit, to an end user device via the Internet, a sign-in request in response to the authorization request;

receive, from the end user device via the Internet, user credentials; and based on the user credentials being authenticated, transmit, to the external analysis system via the Internet, an authorization code, wherein the external analysis system stores the authorization code;

receive, the authorization code from the external analysis system;

transmit an access token to the external analysis system based on receiving the authorization code, wherein the access token is mapped to the streaming video and the access token is valid for a predefined amount of time;

receive, from the external analysis system via the Internet, a clip request that indicates a time period and comprises the access token;

retrieve a video clip based on the video stream of the smart home environment in response to the clip request, the access token received as part of the clip request, and the indicated time period;

identify the event metadata that corresponds to the clip request and the indicated time period based on the timestamp; and transmit, to the external analysis system via the Internet, the video clip and the event metadata, wherein the external analysis system outputs the video clip and the event metadata with alarm information for action.

* * * * *